Oct. 26, 1965

R. A. CRAIG 3,213,491

HARDCOATED MOLD PRESS DIE

Filed Dec. 18, 1961

INVENTOR
RICHARD A. CRAIG
BY M. B. Tasker
ATTORNEY

United States Patent Office 3,213,491
Patented Oct. 26, 1965

3,213,491
HARDCOATED MOLD PRESS DIE
Richard A. Craig, Wethersfield, Conn., assignor to United Aircraft Corporation, East Hartford, Conn., a corporation of Delaware
Filed Dec. 18, 1961, Ser. No. 160,196
4 Claims. (Cl. 18—16.5)

This invention relates to improvements in the die used in the process of electrical resistance sintering under pressure for compacting metallic and/or ceramic powders.

In this process the powders to be compacted are compressed in a die cavity by plungers which are placed between the opposed electrodes of a spot welder. As the electrodes are moved together, the powders are compressed and, while compressed, a low-voltage high-amperage current is passed through them. As a result of the pressure and the high temperatures produced by high currents of the spot welder, the powders are compacted and fused into a solid unitary body.

A major problem in using this process has been to get an acceptable die. The die material, at least in the vicinity of the plungers, must be a good electric resistor so that the current passing through the electrodes will pass through the powders and not through the die; yet, the die must be able to withstand the lateral pressures exerted against it by the powders as they are subjected to high pressures. Also, the die which is in contact with the powders must be such that the hot-pressed compact will not react with the die material. Various ceramic tubes have been tried (MgO, $Al_2O_3$ and $SiO_2$) as a lining for the die cavity, but proved unsatisfactory due to frequent breaking. Breakage of the tube allows the current to bypass the powder. This results in a deformed, imperfectly sintered compact.

It is an object of this invention to provide a die for use in the electrical resistance sintering process which is capable of electrically insulating both the plungers and the material in the die cavity from the die body and which is capable of resisting the lateral pressures developed.

It is a further object of the invention to provide a metallic die body capable of resisting the lateral pressures having an insulating, heat-resisting coating on the wall of the die cavity capable of electrically insulating the plungers and the material in the cavity from the body of the die.

A further object of this invention is to provide an expendable liner for the die cavity which carries the insulating, heat-resistant coating.

These and other objects and advantages of the invention will be pointed out or will be evident from the detailed description of two preferred embodiments of the invention shown in the accompanying drawing.

Figure 1:
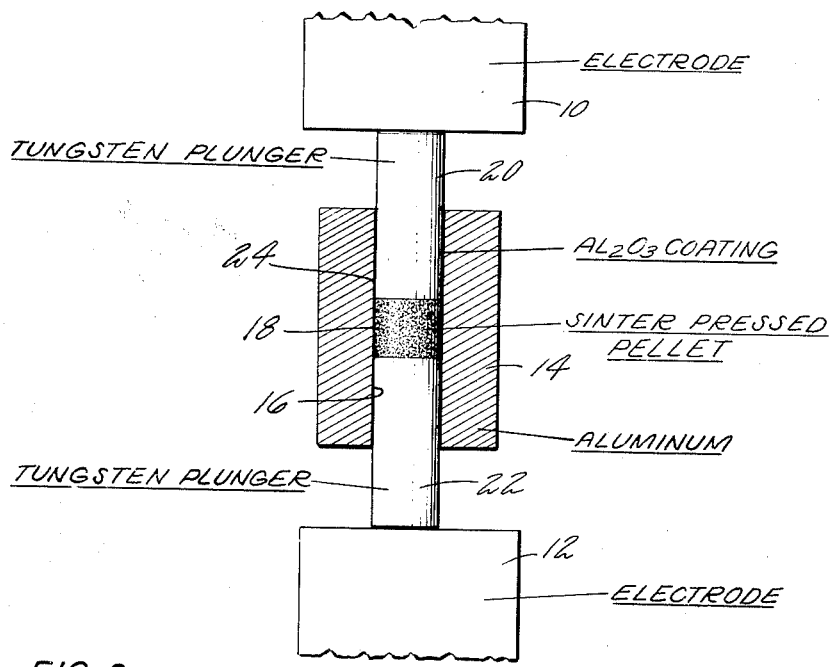

FIG. 1 of the drawing shows in sectional elevation a die embodying the improvements of this invention, the plungers and electrodes of the spot welder and the compact between the plungers being shown in elevation.

Figure 2:
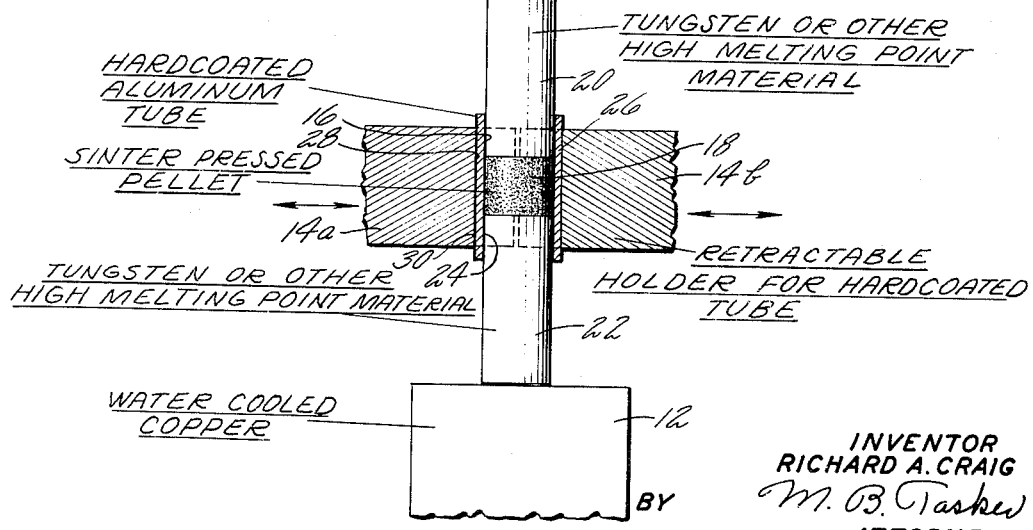

FIG. 2 shows a modified form of die in which a liner is provided in the die cavity, and in which the die which supports the tube is made retractable.

As shown in FIG. 1, 10 and 12 are the axially aligned, opposed electrodes of a usual spot welder. 14 is the die body having an axial passageway 16 therethrough, in which a body 18 of powder is shown compressed. The powder may be ceramic or metallic, or a mixture of both.

Pressure is applied to the powder 18 by upper and lower plungers 20 and 22 which are a close fit in the passageway. These plungers are made of a high-conductivity, high-strength material such as tungsten. The plungers are engaged and the pressure is exerted by electrodes 10 and 12 of the spot welder. Following compaction, the sintering current is supplied by the spot welder. Sintering takes place in a fraction of a second. In order to prevent the current flowing between the electrodes from passing through the body of the die 14 during sintering, a coating 24 of $Al_2O_3$ is provided on the surface of the passageway 16.

This coating 24 is deposited electrolytically by the hardcoating process. This process utilizes a relatively low current over a long time and at a low temperature, and produces a thick coating on the inside of the die passageway which has sufficient electrical resistance and thermal insulation to prevent current flowing between the plungers 20 and 22 from bypassing the powder 18 and passing through the die body. Preferably, the coating should be at least 0.002 of an inch thick and may be as much as .010 of an inch thick, although this may vary with the voltage and current used with different powders.

In coating an aluminum or aluminum alloy die by the hard-coating process, the surfaces to be coated are degreased, and those surfaces which are not to be coated are masked with a minimum of two coats of wax or with lacquer. The parts are then immersed in an aluminum hardcoating solution consisting of 0.6 of a pint of sulfuric acid and 1.5 ounces of oxalic acid per gallon of solution. The solution temperature should be 50° F.±2° F. The parts to be hardcoated should be made anodic, the cathode comprising a lead lining for the tank containing the solution. A current of 36 amperes per square foot (0.25 ampere per square inch) should be used for 40 to 60 minutes to get a coating between .002 of an inch to .003 of an inch. The time required for other thicknesses is proportional. The hardcoat is approximately 50% buildup and 50% penetration. The process described is suitable for hardcoating aluminum and aluminum alloys containing, in general, less than 50% copper or 8% silicon.

A die so coated can be used repeatedly to make compacts where moderate pressures are employed. If very high presures are required, the coating 24 may be destroyed in removing the compact from the die, which will necessitate using a new die for each article formed. In this case, the construction shown in FIG. 2 is of considerable advantage, as it results in a saving in die cost which may be considerable if a large number of articles are to be produced.

In this modified construction a retractable die is employed. Here, the die, as shown, is made in two parts, 14a and 14b, which may be bolted or otherwise secured together so that a sleeve 26 is rigidly supported in an axial passage 28 in the die. Sleeve 26 provides the passageway 16 for plungers 20 and 22 and the metal powders 18 therebetween with the hardcoated coating 24 of $Al_2O_3$, as in FIG. 1. The advantage of the FIG. 2, construction will be obvious, since the cost of the coated sleeve, or tube, 26 is considerably less than the cost of the die body 14 of FIG. 1. The sleeve construction of FIG. 2 has the added advantage that a hardcoating can be applied to the entire surface of the sleeve, the hardcoating layer 30 on the outside of the sleeve 26 thus providing additional heat and electrical resistance.

The electrodes of the spot welder may be water-cooled, as is usual in machines having high-amperage capacity, as would be used in the resistance sintering process above-described. Also, the die 14a, 14b may be water-cooled, if desired, although this has not been shown.

In the practice of the electrical resistance sintering process there is considerable variation in the amperage and time of application, as well as the pressures exerted by the electrodes, depending upon the particular powders used and the density of the compact desired. These are well-known in the art and form no part of the present invention. A good background of information in the use of electrical resistance sintering appears in an article by Professor F. V. Lenel, Journal of Metals, January 1955, pages 158 through 167.

While the die body has been described as made of aluminum, if sufficiently greater pressures are employed it may be desirable to use an aluminum alloy having greater strength.

As a result of this invention it has been made possible to make compacts by the electrical resistance sintering process with no rejects due to faulty insulation of the die cavity. Further, it is possible with the reusable die of FIG. 1, to operate at higher pressures then was possible with the previous dies which used ceramic tubes for insulation.

In the event that the pressures employed make the die nonreusable, it is possible by the practice of this invention to greatly reduce the cost of each compact by utilizing the hardcoated expendable sleeve shown in FIG. 2.

While only two embodiments of the invention have been shown herein for purposes of illustration, it will be evident that numerous changes may be made in the construction and arrangement of the parts without departing from the scope of the invention.

I claim:

1. In the production of bodies of very high density and very precise diameter, apparatus for electrical resistance sintering of metallic and/or ceramic powders under the pressure of relatively axially movable electrode plungers comprising, a die body wherein the base metal is aluminum having a passageway therein aligned with said electrode plungers and into which said plungers extend in close-fitting relation thereto, a hard non-deformable electrolytically-formed oxidized layer on the surface of said passageway, said layer being substantially integral with the base metal of the die body and forming an electrically insulating coating thereon, the diameter of said passageway as coated coinciding with the diameter of the finished body.

2. In the production of bodies of very high density and very precise diameter, apparatus for electrical resistance sintering of metallic and/or ceramic powders under the pressure of relatively axially movable electrode plungers comprising, a die body having a passageway therein, a tube wherein the base metal is aluminum inserted in said passageway and radially supported by it, said tube being in alignment with said electrode plungers and into which said electrode plunges extend is close-fitting relation thereto, a hard non-deformable electrolytically-formed oxidized layer on at least the inner surface of said tube which is substantially integral with the base metal of said tube, said layer thereon forming an electrically insulating coating, the inside diameter of said tube as coated coinciding with the diameter of the finished body.

3. The apparatus of claim 1 in which said coating is at least .002 of an inch thick.

4. A reusable coated die for the production by powder metallurgy techniques of high density pellets of very precise diameter in an electrical resistance apparatus under pressure of electrode of a spot welder comprising, a die body wherein the base metal of aluminum having a passageway therethrough adapted to receive said electrodes and in which the powders to be compacted may be located, said passageway having a hard non-deformable electrolytically-formed oxidized surface layer, said layer being substantially integral with the base metal and comprising an electrically insulating coating.

References Cited by the Examiner

UNITED STATES PATENTS

| | | | |
|---|---|---|---|
| 2,022,528 | 11/35 | Taylor | 18—16.5 |
| 2,665,967 | 1/54 | Bean et al. | 18—47 |
| 2,913,377 | 11/59 | Brown | 204—58 |
| 2,918,416 | 12/59 | Taylor | 204—58 |
| 2,922,710 | 1/60 | Dombrowskit et al. | |
| 2,941,243 | 6/60 | Bundy | 18—16.5 |
| 2,941,244 | 6/60 | Wentorf | 18—16.5 |
| 3,084,388 | 4/63 | Ballhausen | 18—16.5 |
| 3,085,291 | 4/63 | Haes et al. | 18—16.5 |

J. SPENCER OVERHOLSER, *Primary Examiner.*

WILLIAM K. STEPHENSON, MICHAEL V. BRINDISI,
*Examiners.*